United States Patent

[11] 3,594,632

| [72] | Inventor | Paul P. Luger<br>801 Tenth Ave., Seattle, Wash. 98127 |
|---|---|---|
| [21] | Appl. No. | 19,303 |
| [22] | Filed | Mar. 13, 1970 |
| [45] | Patented | July 20, 1971<br>Continuation-in-part of application Ser. No. 562,996, , now Patent No. 3,541,430. |

[54] ADJUSTABLE ATTENUATORS AND FILTER APPARATUS
9 Claims, 14 Drawing Figs.

[52] U.S. Cl. .................................................. 323/74,
323/77, 323/79, 323/80, 333/70, 333/81
[51] Int. Cl. ..................................................... G05f 3/00
[50] Field of Search .......................................... 323/74, 76,
77, 78, 79, 80, 94; 324/62, 98; 333/32, 70, 80, 81

[56] References Cited
UNITED STATES PATENTS

| 2,894,197 | 7/1959 | Berry | 323/79 |
| 2,999,202 | 9/1961 | Ule | 323/74 |
| 3,252,080 | 5/1966 | Newbold et al. | 323/74 |
| 3,369,173 | 2/1968 | Andrews | 323/80 |
| 3,519,930 | 7/1970 | Bradley | 324/98 |

Primary Examiner—Gerald Goldberg
Attorney—Thomas W. Secrest

ABSTRACT: Three types of potentiometer circuits, resistive, capacitive and inductive are employed in overall adjustable attenuator systems. Each element in a switching network is either a single-terminal element or a double-terminal element and minimum contact between networks follow a switch rule principle.

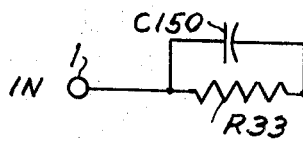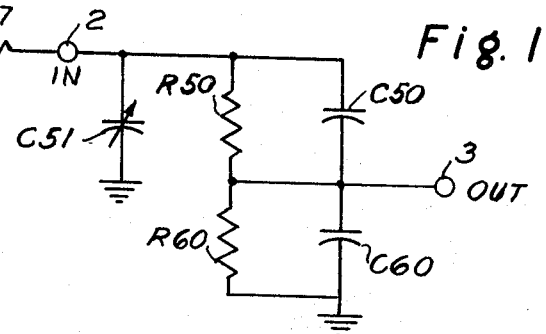
Fig. 1
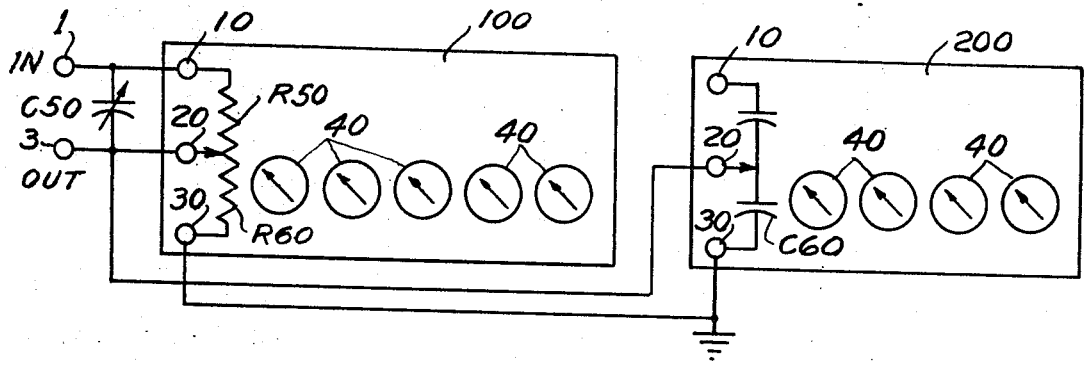
Fig. 2
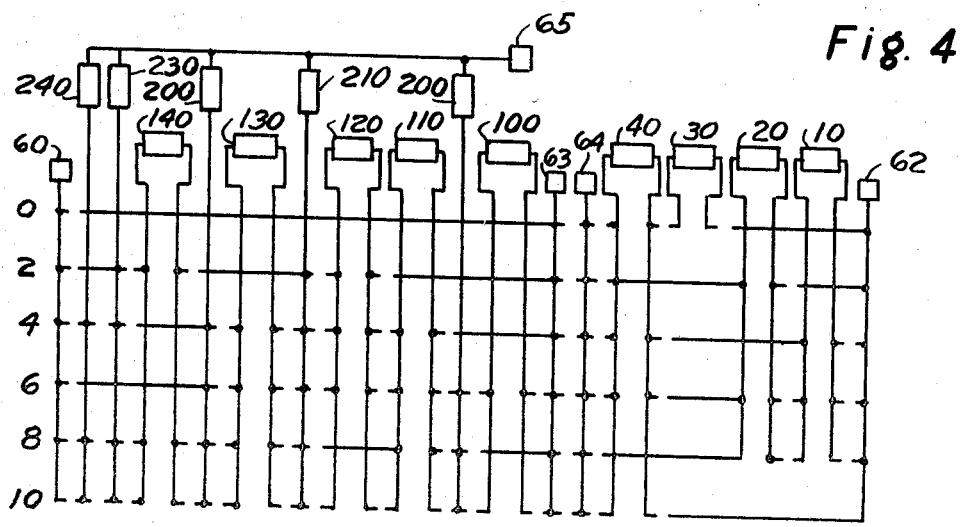
Fig. 4

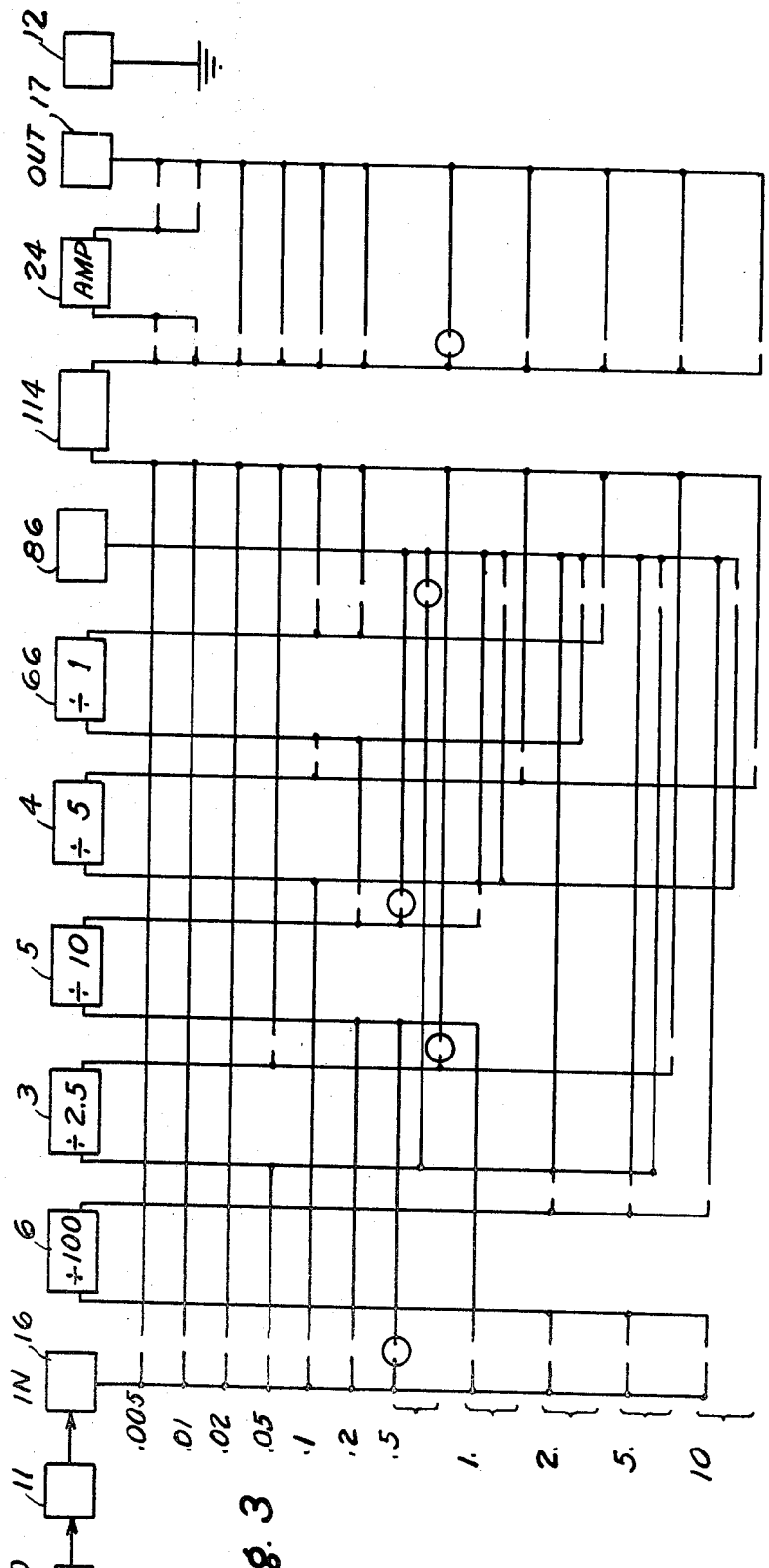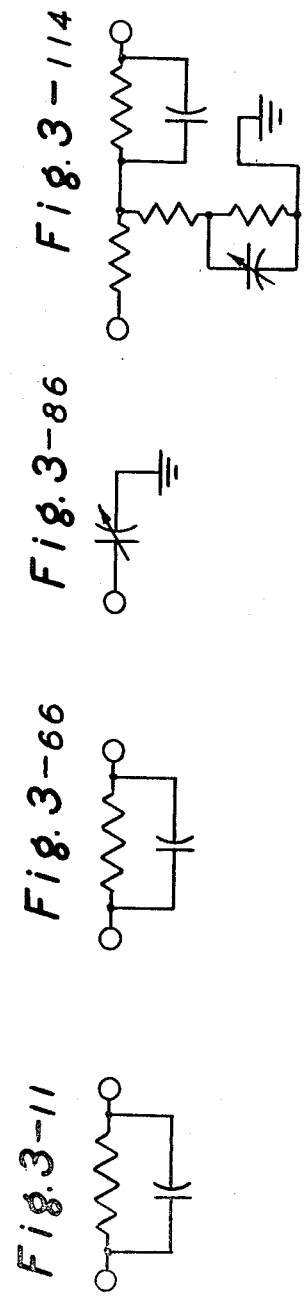

3,594,632

1

ADJUSTABLE ATTENUATORS AND FILTER APPARATUS

This is a continuation-in-part of U.S. application Ser. No. 562,996, June 13, 1966, now U.S. Pat. No. 3,541,430.

In general, attenuator apparatus is capable of modifying, usually, cutting down a signal. This may mean reducing the level of a DC signal or the amplitude of an AC signal. A more special type of attenuation may call for filtering of one type or another together with stepwise cutting down the amplitude of a signal.

This invention, as seen in these applications, will best be understood by reference to the following drawing and accompanying descriptions:

FIG. 1 is a schematic diagram of a simple attenuator.

FIG. 2 is a schematic of a multiple attenuator of the types shown in FIG. 1, employing a potentiometer made entirely from fixed impedances.

FIG. 3 is a schematic of another attenuator employing the switch principle for minimum contact design.

FIG. 3–11, FIG. 3–66, FIG. 3–86 and FIG. 3–114 show some of the circuit elements of FIG. 3.

FIG. 4 is a circuit diagram of a single attenuator section combining circuit hardware both for numerical counting and for filtering.

FIG. 5 is another drawing of FIG. 4, showing selectively, by the dotted lines, various networks alternately connected by the switch assembly shown in FIG. 4.

FIG. 6 is a schematic showing the interconnection of two elemental attenuator sections, designed in the pattern of FIG. 3.

FIG. 7 is a simplification of the schematic of FIG. 2.

Figures 7, 8:
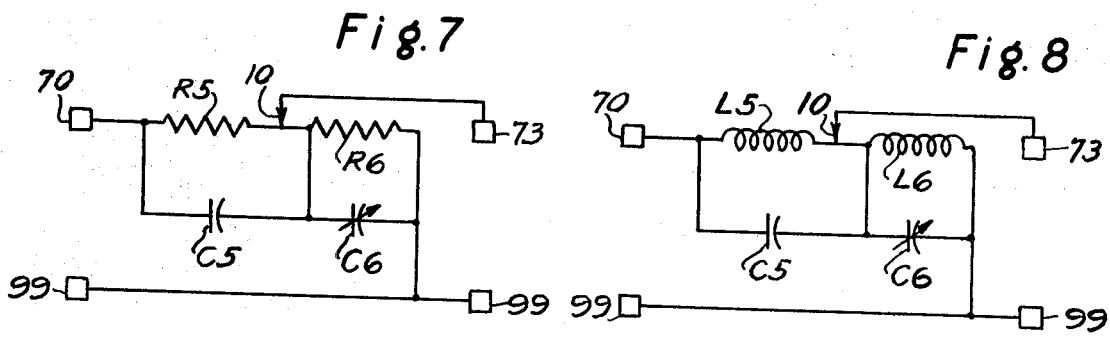
Figures 9, 10:
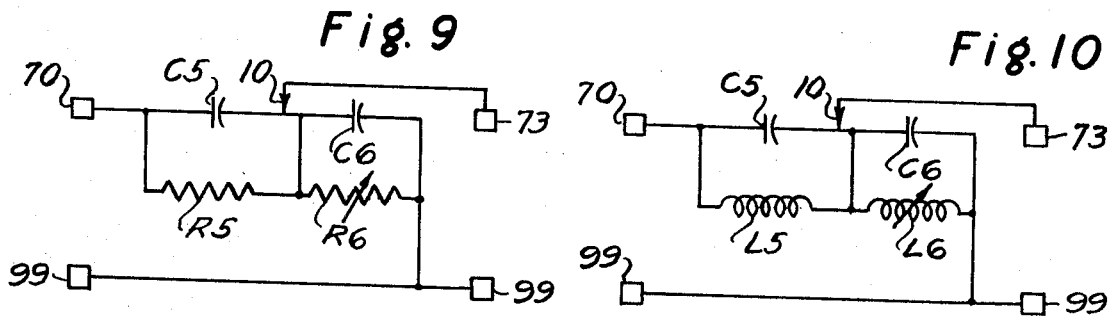

FIGS. 8, 9, and 10 are attenuators showing how various impedance elements may be combined.

Turning now to FIG. 1, there is illustrated a simple attenuator section. Resistors R33 and R47 are damping resistances. Resistor R33 is bypassed by capacitor C150 to aid high frequency response. After input terminal 1, the signal reaches the second input, 2, at the attenuator proper. Before reaching the output terminal at 3 the signal is divided down by resistors R50 and R60. The attenuation ratio is R60 divided by R50 plus R60. This dividing suffices for DC and low frequency AC. However, for higher frequencies, capacitors C50 and C60 are required. Without such capacitive dividing at higher frequencies, resistors R50 and R60 themselves supply capacitive dividing which may be detrimental. To avoid this the RC time constant at each pair; i.e., R50–C50 and R60–C60 are made equal. (The C60 value should also include the capacitance into which output terminal, 3, is connected). Capacitor C51 is useful for standardizing so that a number of different attenuator settings may all have the same input capacitance.

Usually a measuring device as a cathode-ray oscilloscope (CRO) requires several stages of attenuation in order to accommodate any amplitude of input signal to be measured. It should be noted here that the divider of FIG. 1 at R50 and R60 is equivalent to a setting of a resistive potentiometer, made from fixed resistors, described in our parent application. Likewise, the divider formed by C50 and C60 is also equivalent to a setting of a capacitive potentiometer as described in said parent application. It should be remembered that all of the new types of potentiometers referred to are capable of use as two terminal devices; i.e., as resistance or capacitance or inductance boxes. This obtains from the circuit construction employed where all of the impedance elements are in series in the case of the resistive and inductive potentiometers but capable of being connected in parallel across two terminals in the capacitive potentiometers.

Turning now to FIG. 2 it is shown how two potentiometers, one resistive at 100 and another capacitive at 200 may be employed to fill the role of the attenuator circuit between terminals 2 and 3 of FIG. 1. A single fixed capacitance C50 is employed as shown. The circuit of each potentiometer is shown at the left and connections are made so that the two circuits are the same. The circuit elements have identical numberings in the two diagrams. C50 is kept constant but is shown adjustable in FIG. 2 to indicate that initially it may be used to standardize as was done by C51 in FIG. 1.

It should be pointed out for FIG. 2 that the dials at 40 give impedance values of R60 and C60 for the two potentiometers shown at 100 and 200 respectively. Since each potentiometer has a total constant resistance or capacitance the values of R50 and C50 are equal to the total resistance or capacitance minus the values indicated on the dials.

Let us suppose that the circuit of FIG. 2 is designed to be the input to a CRO. Table 1, shows the adjustments for 20 different volt-per-cm. settings for the scope. The volts/cm. are given in column 1. Column 2 gives the attenuation ratios. These are settings for potentiometer 100 of FIG. 2. In column 3 are the settings of capacitance box 200. The table was computed on the basis of a constant input capacitance (C50 plus the CRO input capacitance) here assumed to be 2 micro micro farads.

This simple computer calculated table gives 20 different attenuator settings.

It should be clear that many more intermediate settings are available with the hardware of FIG. 2. Columns 4 and 5 give resistance values for the 20 settings of potentiometer 100. These values always add to 1,000,000 ohms, since the potentiometer was chosen to have this constant impedance. Column 6 gives values of the RC constant in microseconds. Note that RC50 equals RC60. Column 8 shows the input capacitance for each capacitance divider formed by fixed C50 and the various settings of C60. Values are given in micromicrofarads. This table is shown on the following page.

FIG. 3 shows another attenuator switching system which exemplifies the rule or principle for obtaining minimum contact design for attenuators. Here in FIG. 3, attenuator elements are shown in the boxes at 3, 4, 5, 6, and 66. Box 66 in FIG. 3 is shown in FIG. 3–66. It is designed to pass all signals, hence represents a division by one or an attenuation ratio of one.

TABLE I.—VARIABLE ATTENUATOR

| 1 | 2 | 3 | 4 | 5 | 6 | 7 |
|---|---|---|---|---|---|---|
| V./cm. | Attenuation ratio | C60 mmf. | R50 ohms | R60 ohms | RC60– RC50 msec. | Input capac. mmf. |
| .050 | 1.0000 | 0. | 0. | 1,000,000. | 0.0000 | 0.0000 |
| .075 | .6666 | 1. | 333,333. | 666,666. | .6666 | .0066 |
| .100 | .5000 | 2. | 500,000. | 500,000. | 1.0000 | .0100 |
| .200 | .2500 | 6. | 750,000. | 250,000. | 1.5000 | .0150 |
| .500 | .1000 | 18. | 900,000. | 100,000. | 1.8000 | .0180 |
| .750 | .0666 | 28. | 933,333. | 66,666. | 1.8666 | .0186 |
| .800 | .0625 | 30. | 937,500. | 62,500. | 1.8750 | .0187 |
| 1.000 | .0500 | 38. | 950,000. | 50,000. | 1.9000 | .0190 |
| 2.000 | .0250 | 78. | 975,000. | 25,000. | 1.9500 | .0195 |
| 5.000 | .0100 | 198. | 990,000. | 10,000. | 1.9800 | .0198 |
| 8.000 | .0062 | 318. | 993,750. | 6,250. | 1.9875 | .0198 |
| 10.000 | .0050 | 398. | 995,000. | 5,000. | 1.9900 | .0199 |
| 15.000 | .0033 | 598. | 996,666. | 3,333. | 1.9933 | .0199 |
| 20.000 | .0025 | 798. | 997,500. | 2,500. | 1.9950 | .0199 |
| 25.000 | .0020 | 998. | 998,000. | 2,000. | 1.9960 | .0199 |
| 30.000 | .0016 | 1,198. | 998,333. | 1,666. | 1.9966 | .0199 |
| 35.000 | .0014 | 1,398. | 998,571. | 1,428. | 1.9971 | .0199 |
| 40.000 | .0012 | 1,598. | 998,750. | 1,250. | 1.9975 | .0199 |
| 45.000 | .0011 | 1,798. | 998,888. | 1,111. | 1.9977 | .0199 |
| 50.000 | .0010 | 1,998. | 999,000. | 1,000. | 1.9980 | .0199 |

Note.—m.=MICRO; mm.=MICRO micro.

The attenuator at 6 in FIG. 3 is designed to divide a signal down to one one-hundredth of its input value. Other attenuation factors of 10, 5, and 2.5 are shown respectively in 5, 4, and 3 of FIG. 3. Basically, these boxes at 3, 4, 5, and 6 are complete attenuator circuits such as shown in FIG. 1 between terminals 2 and 3.

The Switch Rule for minimum contact design, as applied to attenuators, states:

1. Let each element in a switching network be reduced to a two terminal element or a one terminal element. (e.g. FIG. 1 is a two terminal element while FIG. 3–86 is a one terminal element.)

2. For each two terminal element in the switching circuit one contact must be provided for each terminal of the element, for each switch position in which the element is employed.

3. For each one terminal element in the switching circuit, one contact must be provided for each switch position in which the element is employed.

4. Let each attenuator network have three power terminals. The first and second power terminals must have a switch contact for each switch position; whereas the third power terminal needs no contacts as it serves with the first terminal as a power input and with the second terminal as a power output.

Returning now to FIG. 3, elements 11, 86, and 114 are shown in FIGS. 3—11, 3—86, and 3—114. These are examples of how network elements may be made of several electrical parts but be defined as either one or two terminal elements. Note that ground connections in the figures are not considered as terminals since they are not switched. FIG. 3 is drawn to exemplify the switch rule and is an improvement in regard to the number of switching contacts usually employed. See R. E. Andrews U.S. Pat. No. 3,369,173, FIG. 2 to FIG. 6.

In the parent application of which this is a continuation, we have shown how elements can be used to promote economy in the use of impedance elements for the construction of various types of potentiometers. These potentiometers are capable of dividing potentials to several places and may be adopted for use with any given counting system. Basically then, we have employed a switch to save in our use of impedance elements in systems that are adjustable to various operating positions. Now we might seek to do this same thing in the construction of more complex systems. For example, in networks employing various sections of L, C and R, as in a filter system, it may be desired to select a level of potential, or to select between bands of frequencies or bands of attenuation, or even to select levels of attenuation within a single band of frequencies. In FIG. 2 it has been shown that it is possible to utilize the same impedance hardware for the various levels of attenuation. Now we show how these concepts are applied to attenuation that employs filtering.

FIG. 4 shows a circuit diagram for an adjustable attenuator. Impedance networks indicated by the box diagrams as the 100 series and the 200 series comprise selected values of resistance and/or inductance and/or capacitance. The diagram is intended to demonstrate and also to symbolize how the switch arrangement of this invention might be applied to many different combinations of impedance networks.

In table II there are listed various functions that employ combinations of L, C, and R where applications may be found for the principles of this invention. The functions are listed in column 1, whereas in column 2 and 3 are listed appropriate quantities of L, C and R for the 100 and 200 series impedance networks shown in FIG. 4. It should be noted that the 100 and 200 series networks may represent a single value of L, C and R or various combinations of them. It should also be noted that 100 series networks are arranged, in general, in series, whereas 200 series are in parallel. The 100 series are two terminal networks, the 200 series are one terminal networks. The number of circuits employed depends upon the specific application. The present purpose is to show how the switch design of this invention may be applied in a continuous counting system. (1, 2, 3, 4, 5, etc.), as described previously for the various potentiometers, or in a noncontinuous system, (1, 2, 5, 9, 16, etc.), to any adjustable device whose purpose or function may be varied under one aspect or another.

For example, an attenuator is a device capable of dividing an input signal but it may be comprised of various elements of L and/or C and/or R. One example of an attenuator is the Kelvin-Varley Kelvin-Varley circuit. An attenuator may be constructed entirely of resistors and often enough these are the principle elements involved; the attenuator itself may be considered a two terminal device, one terminal of which, is common to the input and output ends. Attenuators may be either fixed or variable. A filter may be considered a fixed attenuator. Usually a filter is designed to suppress certain frequencies and to pass others. Those frequencies which are attenuated may be cut to as little as two decibels; or they may be limited to any predetermined level. Another function sometimes performed by the attenuator is that of dividing down the input signal potential. This means, in the case of a filter attenuator, to divide down the potential of those frequencies passed by the filter after the fashion of potential dividing potentiometers.

Now there are several applications to the general field of filters to which this invention may be directed:

1. band-pass filter, with variable attenuation in the band,
2. a band-elimination filter with variable attenuation for some predetermined band,
3. variable attenuation for a low-pass filter,
4. variable attenuation for a high pass filter,
5. low-pass and high pass filters for which the cutoff frequency is adjustable,
6. band-pass filter in which the upper or lower limit of the band is adjustable—or both are adjustable,
7. filters of types 1—6 in which the output potential is varied, and
8. a filter in which the band-pass or band-elimination property may be switched to another section of the frequency spectrum.

TABLE II

| FUNCTION | SERIES 100 | SERIES 200 |
| --- | --- | --- |
| Oscillator | L | C |
| Low-pass Filter | L | C |
| High pass Filter | C | L |
| Band-pass Filter | L and C in series | L and C in parallel |
| Band Stop Filter | L and C in parallel | L and C in series |
| DC Filter | R | C |
| Attenuator | R and L | C |
| Attenuator | R | R |
| Integrator | C | R |
| Differentiator | R | C |

For calculating the individual components of the numerous types of complex filters in use today, computer techniques have become an indispensable tool. And with the advent of this tool, many of the applications just mentioned came within easy reach. For the most part, the various filter sections made from capacitor and inductor elements are fixed systems adapted to particular bands and fixed levels of attenuation. By adding the necessary computer selected sections and by employing the switching techniques of this invention, various types of attenuators can be designed.

One may note that for applications 1—4 and 7 mentioned above, the filter itself may be followed by the proper design of a potentiometer. This design may call for capacitor and inductor elements combined into the switch sections together with the proper loading impedance required by the filter. For applications 5, 7 and 8 the filter itself would be designed to be incorporated into a switching mechanism as described in this invention, and illustrated in FIG. 4.

Let us return now to FIG. 4. It has been designed for five steps of attenuation. The zero position of the switch uses impedance elements 30 and 40 which serve to adjust the filter attenuator to, let us say, a 600 ohm level in a particular band of frequencies. The two other sections, 10 and 20, are other filter-attenuators capable, in the circuit, to adjust to another signal level in a given frequency band. These four impedance elements are employed after the manner of resistances in potentiometers made from fixed impedances. See FIG. 1 of the present application, or FIG. 3, this application. Input and output terminals are 60 and 62 with a common terminal 65. Terminals 63 and 64 are "TO" and "FROM" terminals described in the parent application. In some applications, terminals 63 and 64 will be connected together, for others, isolated.

It is to be noted in FIG. 4 that for each switch position there are, in general, two kinds of connections, the series circuit connections, referred to as the 100 series, as well as a common or mutual electrical interconnection for the parallel sections designated as the 200 series networks. These connections, of course, are made accordingly as each particular application may require. Switch contacts also, will be as numerous as required to give isolation both to terminals and impedance networks.

Figure 5:
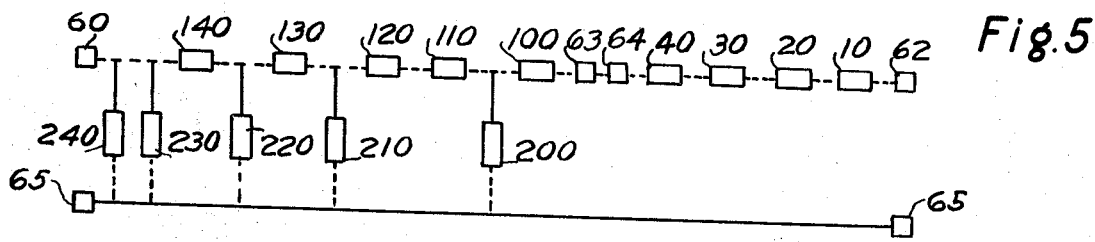

FIG. 5 is another drawing showing FIG. 4. It shows input terminals at 60 and 65 and output terminals at 62 and 65. The dotted lines indicate that not all elements, as 110, 120, 130 and 140 are employed at each switch setting.

Figure 6:
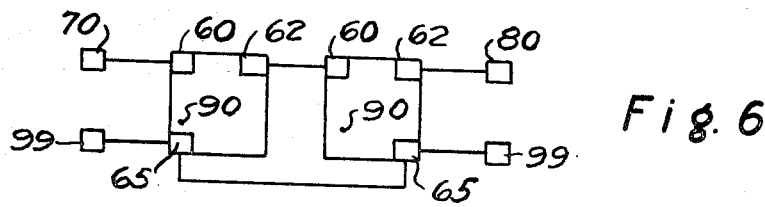

FIG. 6 shows how two sections of FIG. 4 may be interconnected into a single attenuator. In general, these two units, 90 and 91, would require networks (as shown by FIG. 4) each computer calculated; additional units likewise might be ganged together, in which case, as they function interdependently, their impedances could only be determined with computer analysis.

FIG. 7 is equivalent to FIG. 2 and simplifies the diagram. The symbol for a resistive potentiometer formed by R5 and R6 with "slide" contact at 10 is employed instead of box 100 in FIG. 2. C6 in FIG. 7 is used instead of box 200 in FIG. 2. C5 in FIG. 7 equals C50 in FIG. 2. Input terminals are 70 and 99 in FIG. 7 and output terminals are 73 and 99.

FIGS. 8, 9 and 10 show other attenuators, on the pattern of FIG. 7 but with variations. In FIG. 8, L5 and L6 constitute an inductive potentiometer, C6 may employ a capacitive potentiometer used as a two terminal box. C5 is a fixed capacitor as in FIG. 7 and as C50 in FIG. 2.

In FIG. 9, C5 and C6 form a capacitive potentiometer. R6 may be a resistive potentiometer used as a two terminal box and R5 FIG. 9 is a fixed resistor.

In FIG. 10, C5 and C6 again form a capacitive potentiometer, L6 may employ an inductive potentiometer as described in the parent application but used as a two terminal box, and L5 is a fixed inductor.

In the claims, I claim:

1. In combination, in an attenuator device, a plurality of impedance networks, a switch member, three power terminals, each said impedance network having terminals, said terminals of said networks having a plurality of electrical contacts and as required a number up to one for each switch position, said impedance networks being of two types, first of said types of networks capable of interconnection with switch member at each switch position into a series circuit between first and second of three said power terminals and of such relative values as to be able to effect levels of attenuation, together with other cooperating said networks, for a given network design; switch selection means, including ganged common, movable switch contacts for each switch position, said switch positions together with said impedance networks being capable of numerical counting and said switch positions together with selected networks from said impedance networks capable of accommodating signal attenuation; second of said two types of networks designed for parallel connection between selectable points along said series circuit at selected switch positions and third said power terminal, and said first and third power terminals constituting an attenuator input and said second and third power terminal constituting the attenuator output.

2. In an attenuator device as described in claim 1, said numerical counting to represent levels of signal attenuation.

3. In an attenuator device, a plurality of attenuator sections such as described in claim 1, main power terminals comprised of a first main power terminal, an input terminal; a second main power terminal, an output terminal; a third main power terminal, a common terminal to both input and output; a fourth main power terminal for use as a principal "slide" terminal; and further main power terminals for use as additional "slide" terminals; said first and third said main power terminals connected to the input terminals of a first said attenuator section, the output terminals of the first said attenuator section connected to the input terminals of a second attenuator section, the output terminals of the second said attenuator section connected to the input terminals of a third attenuator section and so on until all sections are interconnected, the output terminals of the last attenuator section connected to the main output terminals, namely, the said main second power terminal, and the said main third power terminal, the latter being interconnected to the third terminal of all filter sections, and the fourth said main power terminal and other main power terminals being connected to selected points along the series circuit which is terminated at its ends by the first and second said main power terminals.

4. In combination, in an attenuator device, a three terminal potentiometer, two terminals of which are across the total potentiometer impedance and the third terminal of said three terminal potentiometer is the "slide" terminal, with switch selectable impedance values between two of three terminals, a two terminal impedance device with switch selectable impedance values, a fixed impedance device of the same type of impedance as the said two terminal impedance device, three main power terminals, said two terminal impedance device to be connected in series with the said fixed impedance device to form a series impedance device, this series impedance device to be placed in parallel across the total impedance of the said three terminal potentiometer and also to be connected to two of the three said main power terminals, said series impedance device at the point of connection between said two terminal impedance device and said fixed impedance device to be connected to said "slide" terminal of said three terminal potentiometer, said slide terminal of said potentiometer to be connected to said third main power terminal.

5. In an attenuator device according to claim 4, said first two main power terminals to serve as an attenuator input, and said third main power terminal together with one of the first two main power terminals to serve as an attenuator output.

6. In an attenuator device according to claim 4, said three terminal potentiometer to be a resistive potentiometer, said two terminal impedance device to be a capacitive device and said fixed impedance device to be a capacitive device.

7. In an attenuator device according to claim 4, said three terminal potentiometer to be an inductive potentiometer, said two terminal impedance device to be a capacitive device and said fixed impedance device to be a capacitive device.

8. In an attenuator device according to claim 4, said three terminal potentiometer to be a capacitive potentiometer, said two terminal impedance device to be a resistive device and said fixed impedance device to be a resistive device.

9. In an attenuator device according to claim 4, said three terminal potentiometer to be a capacitive potentiometer, said two terminal impedance device to be an inductive device and said fixed impedance device to be an inductive device.